United States Patent
Ogino et al.

(10) Patent No.: US 9,334,415 B2
(45) Date of Patent: May 10, 2016

(54) INK, BASE TO BE PRINTED, PRINTING DEVICE, PRINTING METHOD, AND METHOD FOR PRODUCING BASE TO BE PRINTED

(71) Applicant: Hitachi Industrial Equipment Systems Co., Ltd., Chiyoda-ku, Tokyo (JP)

(72) Inventors: Masahiko Ogino, Tokyo (JP); Yuichi Sawai, Tokyo (JP); Takashi Naito, Tokyo (JP); Naoshi Takahashi, Tokyo (JP); Hiroshi Sasaki, Tokyo (JP); Kenichi Souma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 14/374,369

(22) PCT Filed: Dec. 5, 2012

(86) PCT No.: PCT/JP2012/081444
§ 371 (c)(1),
(2) Date: Jul. 24, 2014

(87) PCT Pub. No.: WO2013/111456
PCT Pub. Date: Aug. 1, 2013

(65) Prior Publication Data
US 2014/0375736 A1 Dec. 25, 2014

(30) Foreign Application Priority Data
Jan. 26, 2012 (JP) .................... 2012-013658

(51) Int. Cl.
*B41J 2/21* (2006.01)
*B41J 2/01* (2006.01)
(Continued)

(52) U.S. Cl.
CPC ............... *C09D 11/52* (2013.01); *B41J 2/2107* (2013.01); *B41J 11/002* (2013.01);
(Continued)

(58) Field of Classification Search
CPC ............ B41J 2/01; B41J 2/211; B41J 2/1433;
B41J 2/17; B41J 2/17593; B41J 2/2107;
B41J 2/1755; B41J 2/2114; B41J 11/0015;
B41J 11/002; B41J 2/2056; B41J 2/21;
B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............ 347/100, 95, 99, 88, 86, 101, 102, 21, 347/20, 9; 106/31.6, 31.13, 31.27; 523/160, 523/161
See application file for complete search history.

(56) References Cited

U.S. PATENT DOCUMENTS 4,945,071 A * 7/1990 Friesen .................. C03C 3/122
106/1.14
5,273,575 A 12/1993 de Saint Romain
(Continued)

FOREIGN PATENT DOCUMENTS

| JP | 2-293344 A | 12/1990 |
| JP | 5-202326 A | 8/1993 |

(Continued)

OTHER PUBLICATIONS

Acros Organics, Material Safety Data Sheet (May 19, 2005), Section 16, CAS#9002-89-5.*

(Continued)

*Primary Examiner* — Manish S Shah
(74) *Attorney, Agent, or Firm* — Crowell & Moring LLP

(57) ABSTRACT

The purpose of the present invention is to prevent the discoloration of an ink even when the ink is printed on a base to be printed and then exposed to a high-temperature environment. An ink including a glass composite, resin and a conducting agent, wherein the glass composite includes $Ag_2O$ in the range of 10 mass % to 60 mass %, $V_2O_5$ in the range of 5 mass % to 65 mass %, and $TeO_2$ in the range of 15 mass % to 50 mass %, and the total content ratio of the $Ag_2O$, $V_2O_5$, and $TeO_2$ is at least 75 mass %.

10 Claims, 2 Drawing Sheets

(51) Int. Cl.
- *C09D 11/52* (2014.01)
- *C09D 11/322* (2014.01)
- *C09D 11/38* (2014.01)
- *B41J 11/00* (2006.01)
- *C09D 11/36* (2014.01)
- *C08K 3/40* (2006.01)
- *C08K 5/55* (2006.01)

(52) U.S. Cl.
CPC .......... *B41J 11/0015* (2013.01); *C09D 11/322* (2013.01); *C09D 11/36* (2013.01); *C09D 11/38* (2013.01); *B41J 2/2117* (2013.01); *C08K 3/40* (2013.01); *C08K 5/55* (2013.01)

(56) References Cited

U.S. PATENT DOCUMENTS

| | | |
|---|---|---|
| 2004/0070658 A1* | 4/2004 | Janosky et al. ............... 347/106 |
| 2009/0188555 A1 | 7/2009 | Castillo et al. |
| 2009/0189126 A1 | 7/2009 | Prunchak |
| 2012/0309866 A1* | 12/2012 | Jang et al. .................... 347/100 |
| 2014/0145122 A1 | 5/2014 | Sawai et al. |

FOREIGN PATENT DOCUMENTS

| | | |
|---|---|---|
| JP | 2010-116541 A | 5/2010 |
| JP | 2010-520934 A | 6/2010 |
| JP | 2011-512426 A | 4/2011 |
| JP | 2013-32255 A | 2/2013 |
| JP | 2013-132756 A | 7/2013 |
| JP | 2013-133342 A | 7/2013 |
| WO | WO 2005/052071 A1 | 6/2005 |
| WO | WO 2011102569 A1 * | 8/2011 ............. H01L 21/60 |
| WO | WO 2012/020694 A1 | 2/2012 |

OTHER PUBLICATIONS

International Search Report dated Mar. 19, 2013 with English translation (six (6) pages).

European Search Report dated Jun. 11, 2015 (Six (6) pages).

* cited by examiner (a) WITHOUT COLOR FORMER (b) WITH COLOR FORMER

INK, BASE TO BE PRINTED, PRINTING DEVICE, PRINTING METHOD, AND METHOD FOR PRODUCING BASE TO BE PRINTED

TECHNICAL FIELD

The present invention relates to ink, a base to be printed, a printing device, a printing method, and a method for manufacturing a base to be printed.

BACKGROUND ART

Ceramic bases to be printed such as tiles and enamel are printed with manufacture's serial numbers and precise patterns by using the ink jet method and then subject to firing in many cases. Furthermore, as for head lamps of automobiles, projectors, and halogen lamps for optical fiber light sources, the temperature on the surface of lamp rises up to approximately 300° C. at the time of use.

If printing is conducted with ink formed of, for example, a rare earth element complex or an organic dispersing agent in the case where the base to be printed is exposed to high temperature environment as described above, a color former in printing dots discolors due to thermal degradation with elapse of lamp use time and finally a printed shape cannot be discriminated.

In Patent Literature 1, it is disclosed that a colored metallic oxide obtained by using metal salt that is soluble in a solvent as a pigment and converting the metal salt to the colored metallic oxide by heating can be used for marking and an ornament at a temperature of at least 300° C.

In Patent Literature 2, it is disclosed that peeling off of ink can be prevented by using a lead-free glass powder having a softening point that is at most a softening point of an object to be applied such as window glass, a dispersing agent, and a mucilaginous agent which gives high viscosity to a mixture of the glass powder and the dispersing agent.

CITATION LIST

Patent Literature

PATENT LITERATURE 1: JP-A-5-202326
PATENT LITERATURE 2: JP-A-2010-116541

SUMMARY OF INVENTION

Technical Problem

As for the pigment described in Patent Literature 1, however, polymer is degraded by heat and the pigment which has become the metal oxide is brought into a state of being exposed to the atmosphere. During use at high temperatures, therefore, the pigment discolors.

As for Patent Literature 2, a glass powder is mixed with a coloring agent. After heating, therefore, a state in which the coloring agent is covered by glass to some extent is brought about. Since the softening point of the glass powder is in the range of 400 to 450° C. here, the coloring agent discolors when the glass powder is softened.

An object of the present invention is to prevent discoloring caused by thermal history after ink is printed.

Solution To Problem

In order to achieve the object, the present invention has a feature that in ink containing a glass composite the glass composite contains silver (Ag), vanadium (V), and a vitrification component.

Advantageous Effects of Invention

According to the present invention, it is possible to prevent discoloring due to thermal history after printing with ink.

DESCRIPTION OF EMBODIMENTS

Roughly speaking, ink contains a color former, resin, a solvent, and an addition agent besides a glass composite which is an indispensable component. They are agitated and dispersed from each other by an overhead stirrer or the like and ink is formed.

Figure 1:
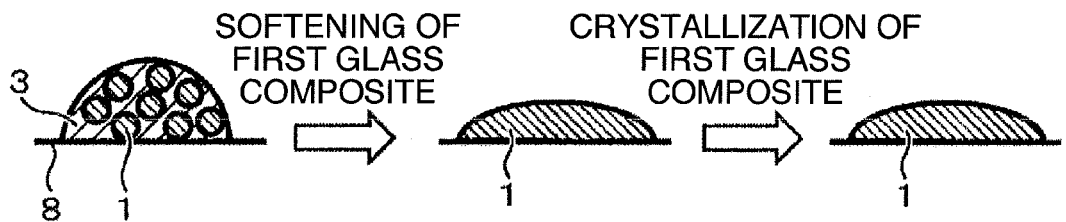
FIG. 1 is a structural schematic diagram of ink on a base to be printed.
Figure 1:
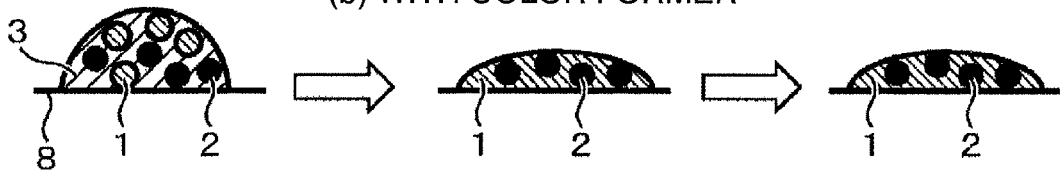

FIG. 1 shows how the structure of ink changes when the ink is applied to a base to be printed and heated. In FIG. 1, (a) shows a case where the ink contains a glass composite (first glass composite) 1 and resin 3, and the ink does not contain color former. As for the ink, the first glass composite 1, the resin 3, and the like exist in a solvent dispersedly. After the ink is printed on and applied to the base to be printed 8, the ink or the base to be printed 8 is heated to a temperature at which the solvent volatilizes and the first glass composite 1 softens. The first glass composite 1 in the present invention contains silver (Ag) and vanadium (V) which are components lowering the softening point, and a vitrification component which vitrifies them. Since the first glass composite 1 is tinged with black, printed letters formed after heating can be discriminated. Then, the base to be printed 8 is fired, and the first glass composite 1 is crystallized. Crystallized glass is stable. Even if the temperature is raised to high temperatures repeatedly after crystallization, therefore, glass is not denatured. Therefore, printed letters are hard to discolor. In the present invention, heating is conducted in two stages, i.e., heating for softening the glass and heating (firing) for crystallizing the glass, in order to fix ink on the base to be printed 8.

In FIG. 1, (b) shows a case where the ink further contains a color former 2. If the color former 2 is contained, letters can be printed with a clearer color as compared with the case where only the first glass composite 1 is contained. The color former 2 is covered by the first glass composite 1 heated and melted. The ink is fixed on the base to be printed 8 without exposing the color former 2 to the atmosphere. Then, the base to be printed 8 is fired at a temperature of the softening point or above, and the first glass composite 1 is crystallized. In other words, since the color former used for printing is covered by glass, the color former does not discolor even in use environment exposed to high temperatures for a long time. In addition, since the softening point of the glass composite is low, the color former does not discolor even if heating is conducted at the time of fixing to the base to be printed, As for the glass composite in the present invention, glass powder fabricated by using a method exemplified hereafter is used. First, oxides containing tellurium (Te), phosphorus (P), barium (Ba) and tungsten (W) as vitrification components besides the oxides containing silver (Ag) and vanadium (V) are mixed with predetermined mass ratios as starting materials and then melted at 800° C. or above, cooled and reduced to powder. As for the glass composite, oxides are stable and desirable. If partial O's in the oxides are replaced by N's, however, bonds in the glass composite are weakened and the softening point can be further lowered. As a component for vitrifying the glass composite, tellurium (Te) or phosphorus (P) is desirable because they contribute to lowering of the softening point.

If the softening point of especially the first glass composite among these glass composites is 300° C. or below, it is desirable because thermal degradation of the color former in contact with glass is hard to occur. As the color former, a colored glass composite (second glass composite) may be used besides a color former described later. In a case where the second glass composite is used, the second glass composite should be higher in softening point than the first glass composite. Specifically, if the Ag oxide is excluded from the first glass composite and an oxide containing chromium (Cr) and molybdenum (Mo) is mixed as starting material powder, glass composition having a softening point of 500° C. or above can be obtained. For example, chromium oxide exhibits a black color if it is divalent or tetravalent, and exhibits a green color if it is trivalent. In a case where the color former itself is glass, even if a part that is not covered by the first glass composite exists, its colored portion also becomes inapt to discolor, Usually, $Ag_2O$ is easily reduced to silver (Ag) by heating. As for the first glass composite, however, vanadium (V) catches silver (Ag) ions. Even if the first glass composite is heated, therefore, reduction is hard to occur and silver (Ag) can exist in glass as ions and silver (Ag) is hard to be precipitated. It is considered that the softening point of the first glass composite is lowered largely by silver (Ag) ions taken in the first glass composite. $Ag_2O$ is used as a white colored pigment sometimes. In this case, however, $Ag_2O$ is reduced and discoloring is cause if heated. $Ag_2O$ in the present invention is not used as a pigment, but used as a glass composite.

The softening point of the glass composite in the present invention generally corresponds especially to a content ratio of $Ag_2O$. Among $TeO_2$ and $P_2O_5$ which become vitrification components, especially $TeO_2$ is desirable because it contributes to improvement of thermal stability of glass. $V_2O_5$ suppresses separating of metal Ag from $Ag_2O$ in glass and contributes to improvement of thermal stability of glass. Furthermore, since separating of metal silver (Ag) from $Ag_2O$ is suppressed by addition of $V_2O_5$, it becomes possible to increase the composition quantity of $Ag_2O$, making the softening point low in temperature is promoted, and chemical stability (for example, resistance to dampness) is improved. Considering them, when components of glass composite are represented by oxides, it is desirable that the total content ratio of $Ag_2O$, $V_2O_3$ and $TeO_2$ is at least 75 mass %. By the way, in the present invention, as for lead which is an inhibited substance in RoHS directive (directive of European Union (EU) on restriction of use of specific hazardous substances in electrical and electronic equipment, enforced on Jul. 1, 2006), lead exceeding a specified value is not contained.

As for more specific glass composition, the softening point can be made equal to 300° C. or below, if $Ag_2O$ in the range of 10 mass % to 60 mass %, $V_2O_5$ in the range of 5 mass % to 65 mass %, and $TeO_2$ in the range of 15 mass % to 50 mass % are contained.

In addition, a mass content ratio of $Ag_2O$ is equal to 2.6 times a mass content ratio of $V_2O_5$ or less. In other words, a ratio of the $Ag_2O$ content ratio to the $V_2O_5$ content ratio, "($Ag_2O$ content ratio)/($V_2O_5$ content ratio)" is 2.6 or less. As a result, separating of metal Ag from $Ag_2O$ is suppressed and the composition quantity of $Ag_2O$ can be increased.

In addition, the softening point of the glass composite can also be made low in temperature by causing the glass composite to contain at least one kind out of $P_2O_5$, BaO, $K_2O$, $WO_3$, $MoO_3$, $Fe_2O_3$, $MnO_2$, $Sb_2O_3$, and ZnO as components with 25 mass % or less.

As for the color former in the present invention, color formers exemplified hereafter are used besides the above-described second glass composite. In the same way as the second glass composite, the color former disperses within the first glass composite and forms a color when the first glass composite softens. As long as the color former is higher in melting point than the softening point of the first glass composite, the color former is not especially restricted. Specifically, it is possible to mention an inorganic pigment such as carbon black, titanium dioxide, zinc oxide, zinc sulfide, white lead, calcium carbonate, precipitated barium sulfate, silicon dioxide, alumina white, kaolinite, talc, bentonite, cadmium red, bengala, molybdate chrome lead, molybdate orange, chrome vermilion, chrome yellow, cadmium yellow, yellow iron oxide, titanium yellow, chromium oxide, viridian, titanium cobalt green, cobalt green, cobalt chrome green, Victoria green, ultramarine blue, iron blue, cobalt blue, cerulean blue, cobalt silica blue, cobalt zinc silica blue, manganese violet, or cobalt violet. Besides, it is possible to mention an organic pigment such as a diketo-pyrrolo-pyrrole pigment, an azo pigment, a phthalocyanine pigment, an anthraquinone pigment, a quinacridone pigment, a dioxazine pigment, a perinone pigment, a perylene pigment, a thioindigo pigment, an isoindoline pigment, an isoindolinone pigment, a quinophthalone pigment, an indanthrene pigment, or a metallic complex pigment. As for a pigment used in the present invention, especially a pigment that is excellent in thermal resistance is desirable. Furthermore, as for a black pigment, especially a black pigment containing Fe is especially desirable from a viewpoint of thermal resistance.

As for the resin in the present invention, there is not especially a restriction as long as it dissolves in the solvent and, after ink is printed on the base to be printed and the solvent evaporates, it plays a role like a binder to tentatively fix the glass composite and the color former onto the base and plays a role to improve the dispersibility of the glass composite and the color former. Specifically, water-soluble resin or a water-soluble macromolecular compound such as nitrocellulose, polyurethane, polycarboxylate ester (such as, for example, polyacrylate), unsaturated polyamide, polycarboxylic acid, polycarboxylate, polysiloxane, polycarboxylate ester containing a hydroxyl group, or denatured substances of them, (meta) acrylic ester-styrene copolymer, styrene-maleic acid copolymer, polyvinyl alcohol, or polyvinyl pyrrolidone, a polyester family, a denatured polyacrylate family or the like is used. They can be used singly or by mixing at least two kinds. It is desirable that a resin type pigment dispersing agent has a weight average molecular weight in the range of approximately 1,000 to 30,000.

As for the addition agent in the present invention, besides a surface active agent for improving the dispersibility of the glass composite and the color former, a conducting agent for controlling the conductive state of the ink and a leveling agent for controlling a shape after the ink drops onto the base to be printed can be mentioned in the case of an ink jet printer of charge control type. As the surface active agent, an anionic active agent, a nonionic active agent, a cationic active agent, or an amphionic active agent can be used. As the anionic active agent, fatty acid salt or alkyl sulfate salt can be exemplified. As the nonionic active agent, a nonionic active agent such as polyoxyethylenealkyl ether, polyoxyethylenealkyl allyl ether, or glycerin-fatty acid ester can be exemplified. As the cationic active agent, alkylamine salt, quarternary ammonium salt or the like can be exemplified. As the conducting agent, a compound having a structure capable of providing a dye with high conductivity, specifically a compound having a metal salt structure is selected, or a conducting agent is added separately. As the leveling agent, a polydimethyl siloxane denatured compound or a perfluoro compound can be used.

Generally, ink for an ink jet printer of charge control type needs to have a specific electrical resistance in the range of 1,000 to 1,500 Ω·cm in order to change the electric charge amount of a liquid drop itself. Therefore, it is necessary to secure required conductivity, and a conducting agent is added as the addition agent. Specifically, a metal salt structure can be mentioned. However, the conducting agent that dissolves in the solvent and that does not corrode, liquefy, and swell members such as a pump and a hose member within the ink jet printer is desired. Considering them, nitrate is desirable. Besides, perchlorate and tetraphenylborate can also be used. Salt in hydrochloric acid is not desirable, because there is a possibility of causing corrosion of SUS, iron or the like. Furthermore, as for the metal kind as well, alkali metal which is high in solubility of metal salt, especially lithium and sodium is desirable. Furthermore, it is also possible to use ammonium ions and tetramethylammonium ions because they tend to be high in solubility. Summarizing the foregoing description, it is possible to use lithium nitrate, sodium nitrate, ammonium nitrate, tetramethylammonium nitrate, lithium perchlorate, sodium perchlorate, ammonium perchlorate, tetramethylammonium perchlorate, lithium tetraphenylborate, sodium tetraphenylborate, ammonium tetraphenylborate, tetramethylammonium tetraphenylborate, or the like.

As for the solvent in the present invention, there is not especially a restriction as long as it dissolves the resin and lowers the viscosity of the ink enough to print. For example, a water family can be used besides an organic solvent such as the aromatic family, the ester family, the ketone family, the hydrocarbon family, the alcohol family, or the glycol.

Figure 2:
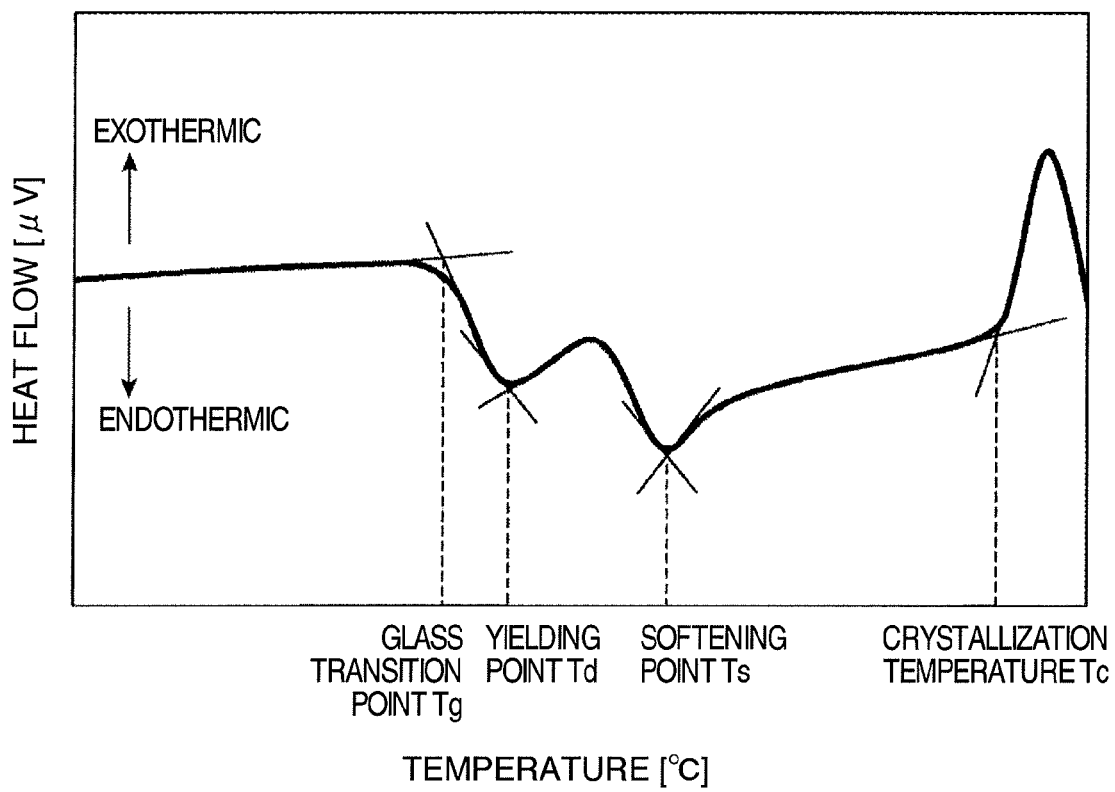
FIG. 2 is a DTA measurement diagram according to the present invention.

The softening point in the present invention was measured by using the differential thermal analysis (DTA). FIG. 2 shows a DTA measurement diagram. As for the DTA measurement, the mass of each of a reference sample (α-alumina) and a measurement sample was set equal to 650 mg, the DTA measurement was conducted at a temperature raising speed of 5° C./min in the atmosphere, and a peak temperature of a second endothermic peak was found as a softening point Ts. A start temperature of a first endothermic peak is a crystallization temperature Tc. By the way, each temperature is a temperature found by using a tangential line method.

A heating temperature at the time when softening the glass composite is generally set to be 30 to 50° C. higher than a softening point Ts of the glass composite. Since it is necessary that the glass composite is not crystallized by heating at this time, it is desirable that a temperature difference between the softening point and the crystallization temperature is at least approximately 50° C.

As for the base to be printed in the present invention, targets are bases exposed to high temperature environments. As the bases, ceramics, glass, metal or the like can be mentioned. These bases to be printed use a material that is not changed in quality or deformed even if high temperature thermal history is applied in the manufacturing process and use environment.

Examples of the ink, the base to be printed, the printing method, the printing device, and the manufacturing method of the base to be printed according to the present invention will now be described in detail. In the ensuing examples, examples in which printing is conducted by an ink jet printer as a method for applying ink will be described.

EXAMPLE 1

First, in the present example, glass composites having various compositions were fabricated and softening points of the glass composites were examined.
(Fabrication of Glass Composite)

Glass composites (g1 to g6) having compositions shown in TABLE 1 were fabricated. Each composition in TABLE 1 is represented by mass ratios in terms of an oxide, of respective components. As a start material, oxide powder (purity of 99.9%) produced by KOJUNDO CHEMICAL LABORATORY CO., LTD was used. In samples of a part, $Ba(PO_3)_2$ (produced by RASA INDUSTRIES, LTD.) was used as a Ba source and a P source.

Powder of respective start materials was mixed with mass ratios shown in TABLE 1 and put in a platinum crucible. Powder was mixed in the crucible by using a spoon made of metal to prevent the material powder from absorbing moisture excessively.

The crucible having material powder therein was placed in a glass melting furnace, and heating and melting were conducted. The temperature was raised at a temperature raising speed of 10° C./min. The crucible was held at a setting temperature (800° C. for g1 to g4, and 1400° C. for g5 and g6) for one hour while agitating melted glass. Then, the crucible was taken out from the glass melting furnace, and glass was cast in a graphite mold previously heated to 150° C. Subsequently, the cast glass was moved to a stress relief furnace previously heated to a stress relief temperature. Stress was removed by holding the cast glass in the stress relief furnace for one hour, and the cast glass was cooled to the room temperature at a speed of 1° C./min. Glass cooled to the room temperature was reduced to powder, and powder of glass composites having compositions shown in TABLE 1 was fabricated.
(Fabrication of Glass Paste)

Powder of each glass composite (having an average particle diameter of 1.0 μm or less) fabricated as described above, the resin and the solvent were mixed, and glass paste was fabricated. With respect to glass composite powder of 7.5 wt %, nitrocellulose of 1.5 wt % was used as the resin and butyl carbitol acetate of one part by weight was used as the solvent to fabricate paste.
(Fabrication of Ink for Ink Jet Printer)

As the solvent, methyl ethyl ketone (MEK) (produced by Wako Pure Chemical Industries, Ltd.) was used, and polyether denatured polydimethyl siloxane (TSF-4452: produced by Momentive) of 0.5 wt % was dissolved as the addition agent. Then, as the conducting agent, lithium tetraphenylborate (produced by Wako Pure Chemical Industries, Ltd.) was dissolved in the same solution to become 0.5 wt %. Finally, g1 paste of 9 wt % was dissolved as the glass composite, and ink for ink jet printer was fabricated.

(Printing, and Thermal Resistance and Adhesive Property Test)

As for ink jet printers (printing devices) of the target of the present example, for example, the charge control type, the ink on demand type or the type in which ink is ejected by a thermal head, which can be used in various known conventional printers, can be mentioned as a representative type. In particular, an ink jet printer of charge control type is desirable in that printing can be conducted on a base to be printed having a curved plane shape as well.

Figure 3:
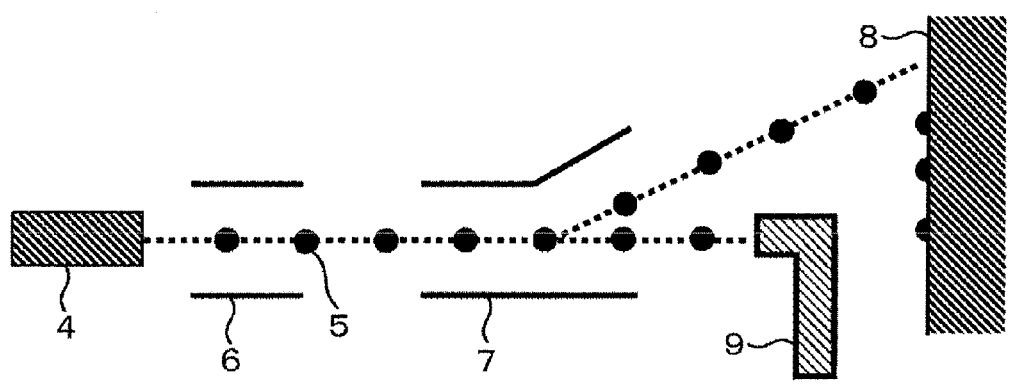
FIG. 3 is a schematic diagram of a head part of an ink jet printer of charge control type.

FIG. 3 shows a process from ink ejection to drop onto the base of an ink jet printer of charge control type. An ink drop 5 ejected from a nozzle 4 is provided with charge by charging electrodes 6 and controlled in direction by deflection electrodes 7. The deflected ink drop 5 drops on a base to be printed 8. Ink that is not used for printing is collected from a gutter 9 and restored to an ink tank (not illustrated). In FIG. 3, the nozzle 4, the charging electrodes 6, the deflection electrodes 7, and the gutter 9 are incorporated in a head (printing mechanism) of the printer.

This ink was used in an ink jet printer device of charge control type (PX-D: produced by Hitachi Industrial Equipment Systems Co., Ltd.), and printing was conducted. Printing was conducted on an alumina substrate (50 mm by 50 mm by 0.25 mm: produced by KYOCERA Corporation) functioning as the base to be printed, then heating was conducted in an electric furnace at 400° C. for 30 minutes, thereby the glass composite g1 was softened and fixed onto the substrate. Then, firing was conducted at 500° C. for three hours, and the glass composite g1 was crystallized. Thereafter, with respect to printed parts, it was observed whether there is discoloring. Furthermore, a tape exfoliation test was conducted and adhesion of the printed matter was evaluated. Results are shown in TABLE 2. In a case where the ink in the present example was used, discoloring was not caused and the substrate adhesion also exhibited a favorable result.

EXAMPLE 2

Figure 4:
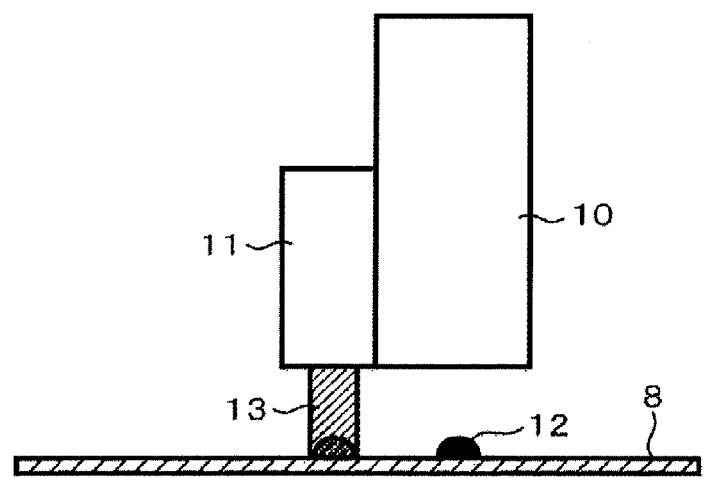
FIG. 4 is a schematic diagram of a heating mechanism using a laser beam.

Ink with the glass composite 1 in the example 1 changed to g2 was fabricated. In the present example, a printed dot is heated by a laser beam. FIG. 4 shows a state in which a laser heating mechanism 11 is attached to a tip portion of a printing head 10 of a printing device and a printed dot 12 formed on a base to be printed 8 is heated by a carbon dioxide laser 13. If laser heating is used, portions other than the printed portion are prevented from being irradiated uselessly, resulting in a favorable heating efficiency. Furthermore, if the heating mechanism 11 is disposed near the printing head 10 to be able to heat immediately after printing, the dot can be irradiated with high precision. After the heating, it was observed whether discoloring is caused in the printed portion. Furthermore, a tape exfoliation test was conducted and adhesion of the printed matter was evaluated. Results are shown in TABLE 2. In a case where the ink in the present example was used, discoloring was not caused and the substrate adhesion also exhibited a favorable result.

EXAMPLE 3

Ink for ink jet with glass paste of g2 of 5 wt % functioning as the glass composite 1 mixed with glass paste of g5 of 5 wt % functioning as the color former 2 was fabricated by using a method similar to that in the example 1. This ink was printed and evaluated by using a method similar to that in the example 1. Results are shown in TABLE 2. In a case where the ink in the present example was used, discoloring was not caused and the substrate adhesion also exhibited a favorable result.

EXAMPLE 4

Figure 5:
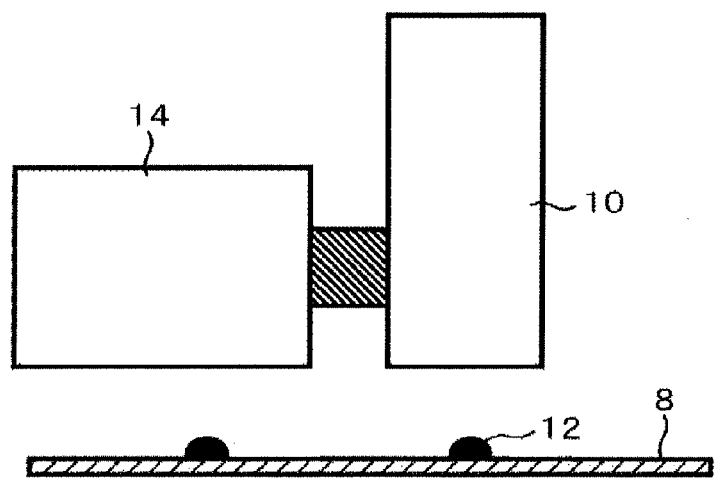
FIG. 5 is a schematic diagram of a heating mechanism using lamp.

Ink was fabricated by using a method similar to that in the example 3. At that time, glass paste of g1 was used as the glass composite 1 and glass paste of g6 was used as the color former 2. In the present example, a printed dot is heated by a lamp. FIG. 5 shows a state in which a lamp heating mechanism 14 is attached to a tip portion of a printing head 10 of a printing device and a printed dot 12 formed on a base to be printed 8 is heated by a lamp. After printing, the printed dot 12 was heated at 500° C. for one second and the printed dot 12 was fixed on the base to be printed 8. This ink was evaluated by using a method similar to that in the example 1. Results are shown in TABLE 2. In a case where the ink in the present example was used, discoloring was not caused and the substrate adhesion also exhibited a favorable result.

As other heating methods, microwave heating, resistance heating and the like can be mentioned.

EXAMPLE 5

Ink was fabricated by using a method similar to that in the example 1. At that time, glass paste of g1 of 5 wt % was added as the glass composite 1 and Black #3550 in a Cu—Mn—Fe family (produced by Dainichiseika Color & Chemicals Mfg. Co., Ltd.) of 5 wt % was added as the color former. This ink was evaluated by using a method similar to that in the example 1. Results are shown in TABLE 2. In a case where the ink in the present example was used, discoloring was not caused and the substrate adhesion also exhibited a favorable result.

EXAMPLE 6

Ink was fabricated by using a method similar to that in the example 5. At that time, glass paste of g1 was used as the glass composite 1. This ink was printed and evaluated by using a method similar to that in the example 1. Results are shown in TABLE 2. In a case where the ink in the present example was used, discoloring was not caused and the substrate adhesion also exhibited a favorable result.

COMPARATIVE EXAMPLE 1

Ink was fabricated by adding solvent black 29 (produced by BASF) of 10 wt % into an MEK solution with an addition agent similar to that in the example 1 added and printed under the same condition as that in the example 1. This sample was evaluated under the same condition as that in the example 1. Results are shown in TABLE 2. Discoloring was caused and a black color portion peeled off in an adhesion test.

COMPARATIVE EXAMPLE 2

Ink was fabricated in the same way as the example 4. At that time, the glass composite 1 was not added and the quantity of the color former 2 was set equal to 10 wt %. This sample was subjected to heat treatment by using the same method as that in the example 4 and evaluated in the same way. Results are shown in TABLE 2. Although discoloring did not occur, a black color portion peeled off in the adhesion test.

COMPARATIVE EXAMPLE 3

Ink for ink jet printer was fabricated in the same way as the example 5. At that time, the glass composite 1 was not added and the quantity of the color former 2 was set equal to 10 wt %. This sample was subjected to heat treatment by using the same method as that in the example 4 and evaluated in the same way. Results are shown in TABLE 2. Discoloring was caused and a black color portion peeled off in the adhesion test.

TABLE 1

Glass composition and softening point

| Composition (wt %) | g1 | g2 | g3 | g4 | g5 | g6 |
|---|---|---|---|---|---|---|
| $V_2O_5$ | 30 | 35 | 25 | 20 | 14 | 15 |
| $Ag_2O$ | 30 | 25 | 20 | 35 | | |
| $Te_2O$ | 30 | 40 | 35 | 30 | | |
| $P_2O_5$ | 5 | | 10 | | 24 | 30 |
| $Ba(PO_3)_2$ | | | | 10 | | |
| BaO | | | | | 12 | 15 |
| $WO_3$ | 5 | | | 5 | 45 | 32.5 |
| $Sb_2O_3$ | | | | | | |
| $Fe_2O_3$ | | | 10 | | | |
| $Cr_2O_3$ | | | | | 5 | 5 |
| $MoO_3$ | | | | | | 2.5 |
| Softening point (° C.) | 284 | 286 | 296 | 269 | 727 | 724 |

TABLE 2

Composition of ink for ink jet printer and evaluation results

| | Example 1 | | Example 2 | | Example 3 | | Example 4 | | Example 5 | |
|---|---|---|---|---|---|---|---|---|---|---|
| Glass component 1 | g1 | 9 | g2 | 9 | g2 | 5 | g1 | 5 | g2 | 5 |
| Glass component 2 | — | | — | | g5 | 5 | g6 | 5 | — | |
| Color former | — | | — | | — | | — | | Cu—Mn—Fe family | 5 |
| Addition agent | Lithium tetraphenyl borate | 0.5 | Lithium tetraphenyl borate | 0.5 | Lithium tetraphenyl borate | 0.5 | Lithium tetraphenyl borate | 0.5 | Lithium tetraphenyl borate | 0.5 |
| | TSF-4445 | 0.5 | TSF-4445 | 0.5 | TSF-4445 | 0.5 | TSF-4445 | 0.5 | TSF-4445 | 0.5 |
| Solvent | MEK | 90 | MEK | 90 | MEK | 90 | MEK | 90 | MEK | 90 |
| High temperature discoloring | ○ | | ○ | | ○ | | ○ | | ○ | |
| Adhesion | ○ | | ○ | | ○ | | ○ | | ○ | |

| | Example 6 | | Comparative example 1 | | Comparative example 2 | | Comparative example 3 | |
|---|---|---|---|---|---|---|---|---|
| Glass component 1 | g1 | 5 | — | | — | | — | |
| Glass component 2 | — | | — | | g6 | 10 | — | |
| Color former | Cu—Mn—Fe family | 5 | Solvent black 29 | 10 | — | | Cu—Mn—Fe family | 10 |
| Addition agent | Lithium tetraphenyl borate | 1 | Lithium tetraphenyl borate | 0.5 | Lithium tetraphenyl borate | 0.5 | Lithium tetraphenyl borate | 0.5 |
| | TSF-4445 | 1 | TSF-4445 | 0.5 | TSF-4445 | 0.5 | TSF-4445 | 0.5 |
| Solvent | MEK | 90 | MEK | 90 | MEK | 90 | MEK | 90 |
| High temperature discoloring | ○ | | x | | ○ | | x | |
| Adhesion | ○ | | x | | x | | x | |

REFERENCE SIGNS LIST

1 Glass composite (first glass composite)
2 Color former (second glass composite)
3 Resin
4 Nozzle
5 Ink drop
6 Charging electrode
7 Deflection electrode
8 Base to be printed
9 Gutter
10 Printing head (printing mechanism)
11 Laser heating mechanism (heating mechanism)
12 Printed dot
13 Carbon dioxide laser beam
14 Lamp heating mechanism (heating mechanism)

The invention claimed is:

1. Ink for an ink jet printer, comprising a glass composite, resin, and a conducting agent,
   wherein the weight average molecular weight of the resin is 1,000 to 30,000;
   wherein the glass composite comprises $Ag_2O$ in the range of 10 mass % to 60 mass %, $V_2O_5$ in the range of 5 mass % to 65 mass %, and $TeO_2$ in the range of 15 mass % to 50 mass %, and the total content ratio of the $Ag_2O$, $V_2O_5$, and $TeO_2$ is at least 75 mass %; and
   wherein the glass composite further contains at least one component selected from the group consisting of $P_2O_5$, BaO, $K_2O$, $WO_3$, $MoO_3$, $Fe_2O_3$, $MnO_2$, $Sb_2O_3$, and ZnO.

2. The ink for an ink jet printer according to the claim 1, the conducting agent is any one of nitrate, perchlorate, and tetraphenylborate combines with any one of alkali metal ions, ammonium ions, and tetramethylammonium ions.

3. The ink for an ink jet printer according to claim 1, wherein the ink comprises polydimethyl siloxane.

4. The ink for an ink jet printer according to claim 1, wherein the ink comprises a second glass composite that is higher in softening point than the glass composite.

5. A base to be printed, with the ink according to claim 1 applied thereto.

6. The base to be printed according to claim 5, wherein the base to be printed is heated at a temperature that is at least a softening point of the glass composite.

7. A printing device, comprising a printing mechanism to apply the ink according to claim 1, and a heating mechanism to conduct heating at a temperature that is at least a softening point of the glass composite.

8. A printing method, comprising the steps of:
   (1) applying the ink according to claim 1 to a base to be printed; and
   (2) heating at a temperature that is at least a softening point of the glass composite.

9. A manufacturing method of a base to be printed, the method comprising the steps of:
   (1) applying the ink according to claim 1 to a base to be printed; and
   (2) heating at a temperature that is at least a softening point of the glass composite.

10. The ink for an ink jet printer according to claim 1, wherein the temperature difference between the softening point and the crystallization temperature of the glass composite is at least approximately 50° C.

* * * * *